United States Patent
Ichikawa (10) Patent No.: US 8,282,252 B2
(45) Date of Patent: Oct. 9, 2012

(54) VEHICLE INTERIOR LIGHT SOURCE UNIT

(75) Inventor: Tadaoki Ichikawa, Aichi-ken (JP)

(73) Assignee: Toyoda Gosei Co., Ltd., Nishikasugai-Gun, Aichi-Ken (JP)

( * ) Notice: Subject to any disclaimer, the term of this patent is extended or adjusted under 35 U.S.C. 154(b) by 475 days.

(21) Appl. No.: 12/585,791

(22) Filed: Sep. 24, 2009

(65) Prior Publication Data

US 2010/0080014 A1    Apr. 1, 2010

(30) Foreign Application Priority Data

Sep. 29, 2008  (JP) ................................ 2008-251889

(51) Int. Cl.
*B60Q 3/00* (2006.01)

(52) U.S. Cl. ......... 362/488; 362/549; 362/546; 362/471

(58) Field of Classification Search ................. 362/471, 362/488, 489, 490, 491, 492, 541, 546, 549, 362/647, 652, 655, 362, 368, 370, 374, 375; 40/593
See application file for complete search history.

(56) References Cited

U.S. PATENT DOCUMENTS

| | | | | |
|---|---|---|---|---|
| 6,888,723 | B2 | 5/2005 | Kamiya et al. | |
| 7,093,964 | B2 * | 8/2006 | Bynum | 362/488 |
| 7,290,905 | B2 * | 11/2007 | Tiesler | 362/488 |
| 7,607,807 | B2 * | 10/2009 | Hall | 362/488 |
| 7,775,694 | B2 * | 8/2010 | Nagai et al. | 362/490 |
| 2005/0174791 | A1 * | 8/2005 | Bynum | 362/490 |
| 2005/0254250 | A1 * | 11/2005 | Nagai et al. | 362/490 |
| 2006/0061128 | A1 * | 3/2006 | Hall | 296/97.9 |
| 2006/0092659 | A1 * | 5/2006 | Bynum | 362/549 |
| 2007/0070639 | A1 * | 3/2007 | Tiesler | 362/488 |
| 2007/0139944 | A1 * | 6/2007 | Nagai | 362/488 |
| 2008/0198607 | A1 * | 8/2008 | Goto | 362/362 |
| 2009/0073707 | A1 * | 3/2009 | Nagai et al. | 362/490 |

FOREIGN PATENT DOCUMENTS

| | | |
|---|---|---|
| JP | 7-263723 | 10/1995 |
| JP | 2003-258314 | 9/2003 |

* cited by examiner

*Primary Examiner* — Bao Q Truong
(74) *Attorney, Agent, or Firm* — McGinn IP Law Group, PLLC (57) ABSTRACT

A vehicle interior light source unit for being disposed at an installation hole formed in a panel of a vehicle interior. The light source unit includes a connector portion that is disposed on a back side of the panel and includes a tubular main body extending parallel to the panel, a substrate that is mounted on the connector portion and mounts a light emitting element thereon, and a case to be inserted into the installation hole. The case includes an upper wall including an opening for radiating light emitted from the light emitting element to the vehicle interior, a pair of sidewalls including a connector engagement portion to be engaged with a side portion of the main boy of the connector portion.

20 Claims, 11 Drawing Sheets

FIG. 11

VEHICLE INTERIOR LIGHT SOURCE UNIT

The present application is based on Japanese patent application No. 2008-251889 filed on Sep. 29, 2008, the entire contents of which are incorporated herein by reference.

BACKGROUND OF THE INVENTION

1. Field of the Invention

This invention relates to a light source unit disposed in a panel of a vehicle interior and enabled to connect to a harness connector.

2. Description of the Related Art

A light source unit is known which comprises a connector portion extending laterally, a case disposed laterally adjacent to the connector portion, and an LED (light emitting diode) disposed in the case (JP-A-2003-258314). A circuit part electrically connected to the LED is disposed in the case and the connector portion is attached outside the case.

However, the light source unit of JP-A-2003-258314 has the problem that the size thereof increases since the connector portion and the case enclosing the LED are arranged in the lateral direction. Therefore, it requires a large space on the back of a vehicle panel in which the light source unit is installed. Thus, the light source unit is not suited to installation for the vehicle interior.

SUMMARY OF THE INVENTION

It is an object of the invention to provide a vehicle interior light source unit downsized to be suited to installation for the vehicle interior.

(1) According to one embodiment of the invention, a vehicle interior light source unit for being disposed at an installation hole formed in a panel of a vehicle interior comprises:

a connector portion that is disposed on a back side of the panel and comprises a tubular main body extending parallel to the panel;

a substrate that is mounted on the connector portion and mounts a light emitting element thereon; and a case to be inserted into the installation hole, wherein the case comprises an upper wall comprising an opening for radiating light emitted from the light emitting element to the vehicle interior, a pair of sidewalls comprising a connector engagement portion to be engaged with a side portion of the main boy of the connector portion.

In the above embodiment (1), the following modifications, changes and a combination thereof can be made.

(i) The connector portion comprises a connecting terminal comprising one end disposed in the main body and an other end extending upward, and the substrate comprises a hole into which the connecting terminal is inserted.

(ii) The main body comprises a concave portion comprising a region that the connecting terminal extends upward, and the connecting terminal is fixed to the substrate by a solder material.

(iii) The case comprises a shielding portion for shielding externally the concave portion.

(iv) The sidewalls of the case each comprise a sidewall main body on which the connector engagement portion is formed, and a panel engagement portion that is disposed away from the sidewall main body and is adapted to be engaged with the panel.

(v) The side walls of the case each further comprise a pair of ribs protruding from the sidewall main body and extending in a vertical direction, and the panel engagement portion is disposed between the ribs and connected to a lower part of the ribs.

(vi) The case encompasses the connector portion.

Points of the Invention

According to one embodiment of the invention, a vehicle interior light source unit is constructed such that a substrate with an LED element mounted thereon is mounted on the main body of a connector portion, and a case is engaged with the sidewall of the main body of the connector portion. Thus, the light source unit can be downsized. Specifically, the connector portion is encompassed inside the case (in top view) such that the entire light source unit can be significantly downsized as compared to the conventional light source unit with the connector portion and the case disposed in the lateral direction. Further, since the connector insertion/release direction in the connector portion is parallel to the panel of a vehicle interior, it is not necessary to have a large space on the back side of the panel, and the light source unit is suited to the installation to the vehicle interior.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1:
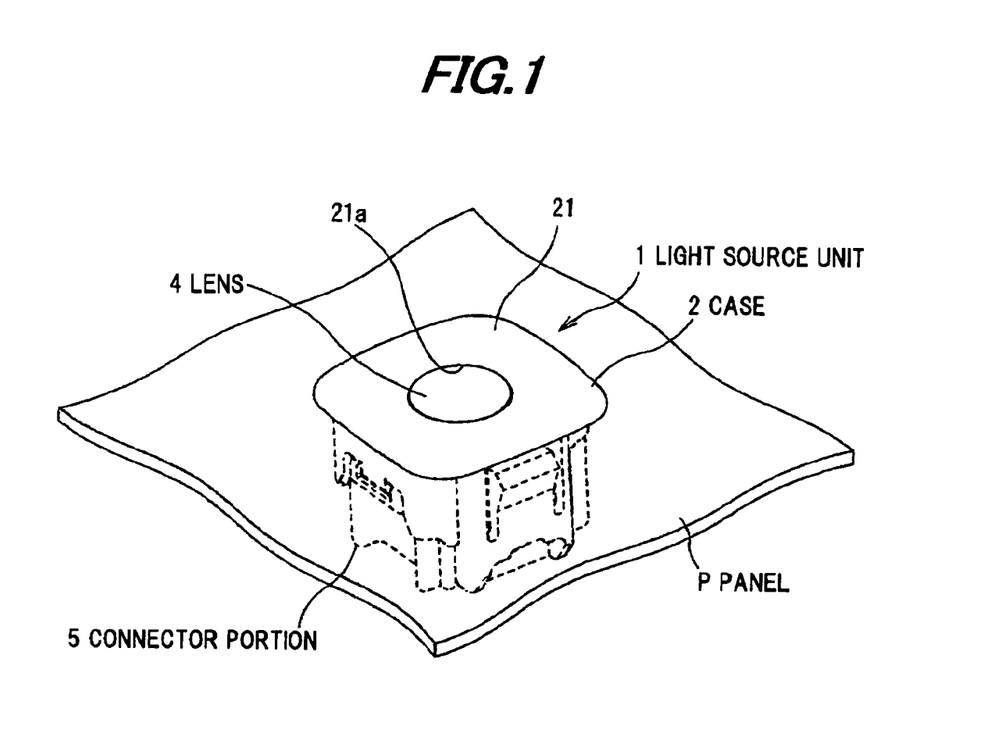
FIG. 1 is a perspective view showing a light source unit in a first preferred embodiment according to the invention, the light source unit being installed in a panel of a vehicle interior.

FIGS. 1 to 6 show the first embodiment of the invention, and FIG. 1 is a perspective view showing a light source unit in the first embodiment, the light source unit being installed in a panel of a vehicle interior.

As shown in FIG. 1, the light source unit 1 is disposed in an installation hole H (See FIG. 6) formed in a panel P of a vehicle interior such that light from an LED element 3 (not shown in FIG. 1) located inside a case 2 is radiated through a lens 4 to a predetermined area. The light source unit 1 is provided with a connector portion 5 that has a main body 51 (not shown in FIG. 1) disposed on the back side of the panel P and extending parallel to the panel P, and is electrically connected to a harness connector (not shown) to feed current the LED element 3.

Figure 2:
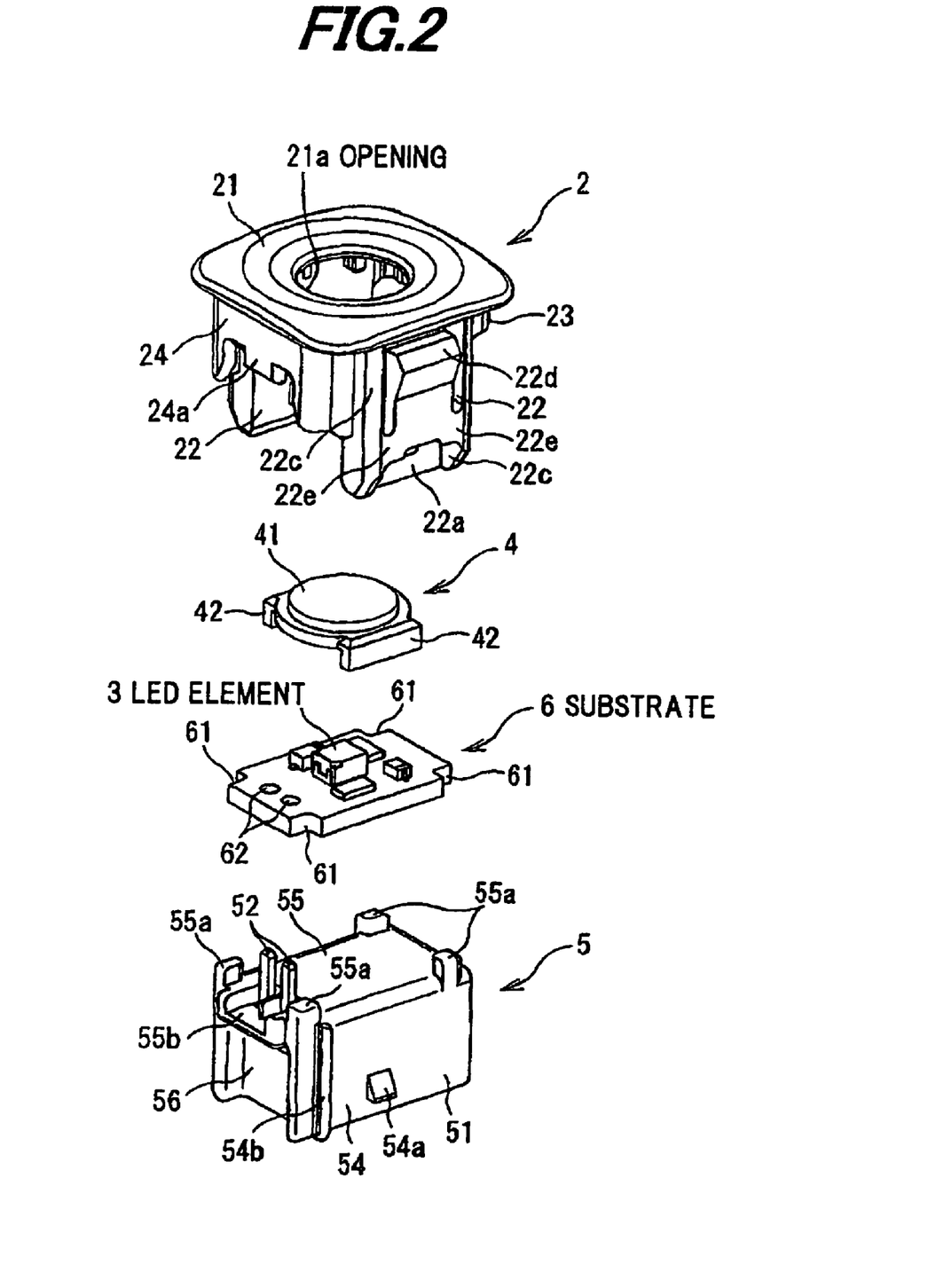
FIG. 2 is a perspective broken view showing the light source unit.

FIG. 2 is a perspective broken view showing the light source unit.

As shown in FIG. 2, the light source unit 1 comprises the case 2 to be inserted through the installation hole H formed in the panel P, a connector portion 5 engaged with the case 2, a substrate 6 mounted on the connector portion 5, the LED element 3 mounted on the substrate 6, and the lens 4 covering the LED element 3 and disposed over the substrate 6. Hereinafter, for explanation, the normal line of the panel P is defined as a vertical direction, the extension direction of the connector portion 5 is defined as a front-back direction.

The case 2 is formed of, e.g., a resin such as PBT (polybutylene terephthalate), PP (polypropylene), ABS (acrylonitrile butadiene styrene), PA (polyamide) etc. and comprises a upper wall 21 exposed to the vehicle interior from the panel P, a pair of sidewalls 22 disposed laterally and extending downward from the bottom face of the upper wall 21, and a front wall 23 and a back wall 24 extending downward from the bottom face of the upper wall 21. The upper wall 21 is formed a square plate with rounded corners, and has an opening 21a for radiating light emitted from the LED element 3 to the vehicle interior. In this embodiment, the opening 21a is circular, formed at the center of the upper wall 21, and the lens 4 is disposed therein. The top surface of the upper wall 21 is curved to be convex upward from the opening 21a to the outer edge. The bottom surface of the upper wall 21 is formed flat and contacts the top surface of the panel P.

Figure 3:
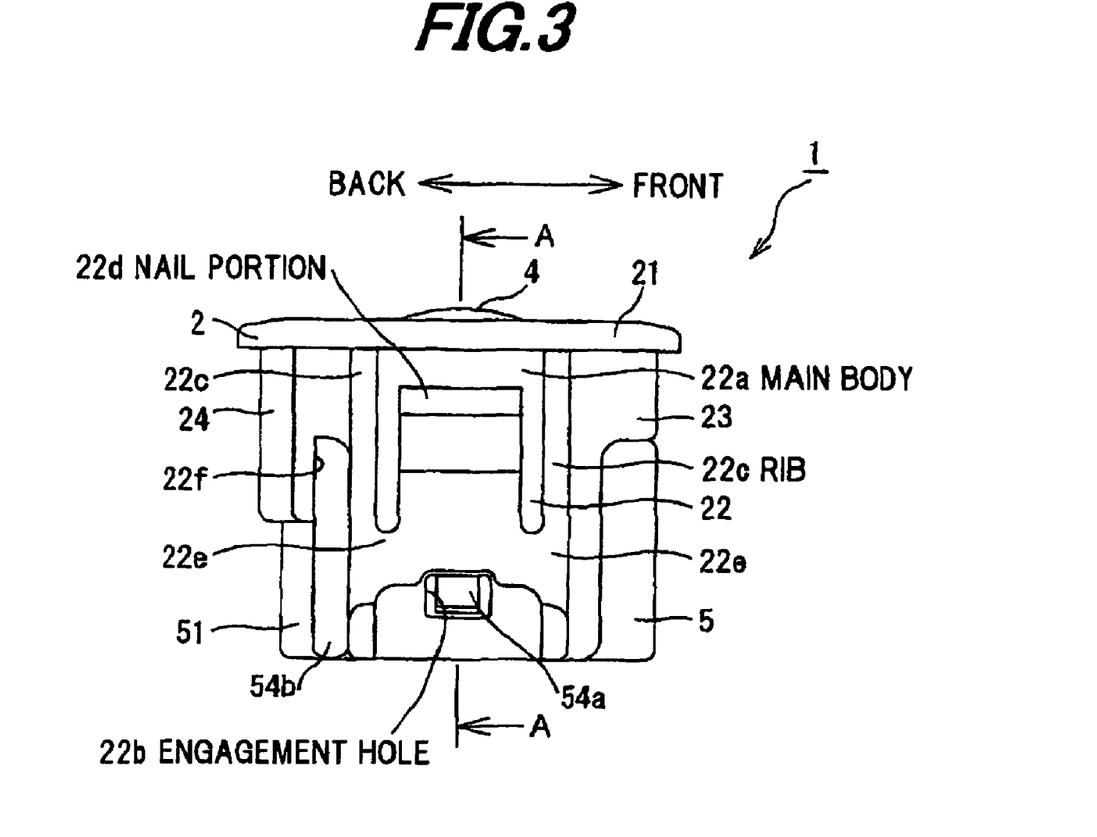
FIG. 3 is a side view showing the light source unit.

FIG. 3 is a side view showing the light source unit.

As shown in FIG. 3, the sidewalls 22 each comprise a plate main body 22a extending upward, and an engagement hole 22b to engage with a nail portion 54a of the connector portion 5 at a lower and central part of the main body 22a. The engagement hole 22b as the connector engagement part can be engaged with the side portion in the width direction of the main body 51 of the connector portion 5. The connector engagement part formed on the sidewall 22 may be modified suitably according to the shape or the like of the connector 5 side, e.g., a hole, a protrusion (ridge) and a nail. The sidewalls each comprise a pair of ribs in the front-back direction formed on the outer face of the main body 22a and extending in the vertical direction. Between the ribs 22c, a nail portion 22d is disposed that is separate from the main body 22a in the lateral direction and used as a panel engagement part to engage with the panel P. The nail portion 22d protrudes outward in the lateral direction, and a lower end thereof is connected to the rib 22b through a pair of connecting portions 22e. Namely, the nail portions 22d are structured such that it can move (or bend) around its lower end in the lateral direction by its elastic deformation. Further, the rib 22c at the rear side of the main body 22a has a groove portion 22f extending upward from the bottom.

Figure 4:
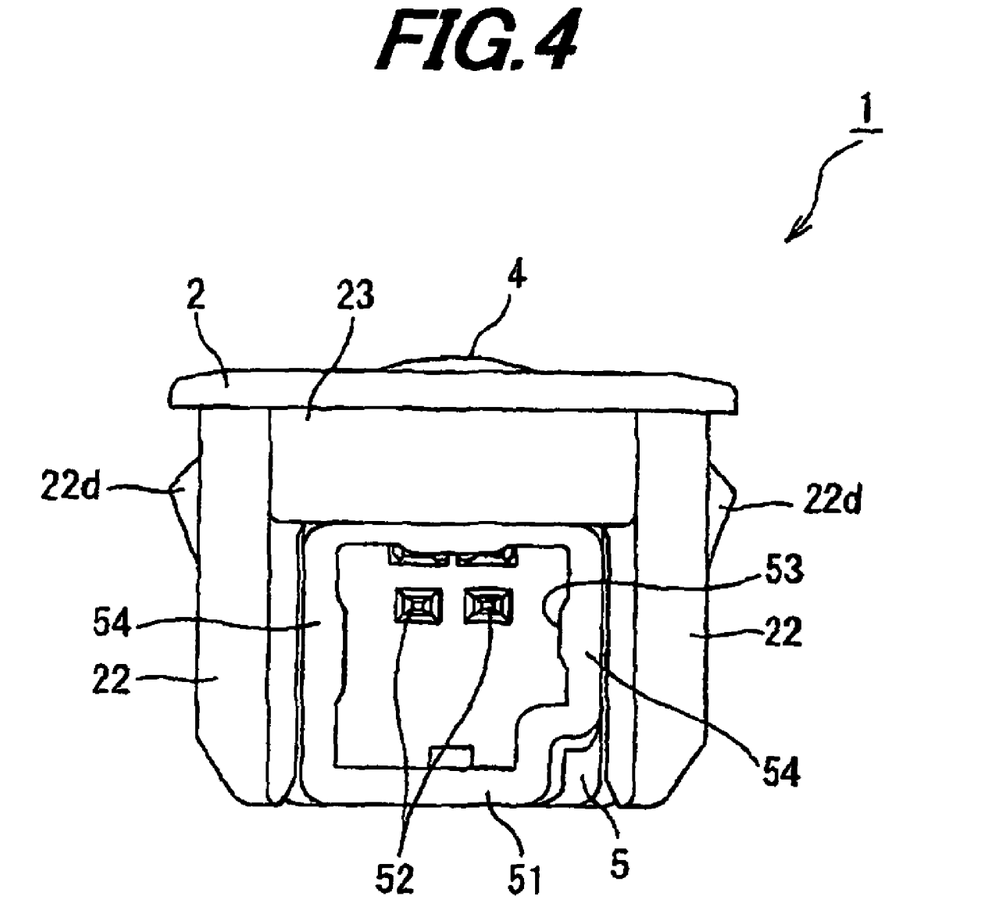
FIG. 4 is a front view showing the light source unit.

FIG. 4 is a front view showing the light source unit.

As shown in FIG. 4, a front wall 23 is formed a plate extending vertically such that its bottom end is higher than the sidewalls 22. The front wall 23 contacts the front end of the top face of the connector portion 5 at the bottom end.

Figure 5:
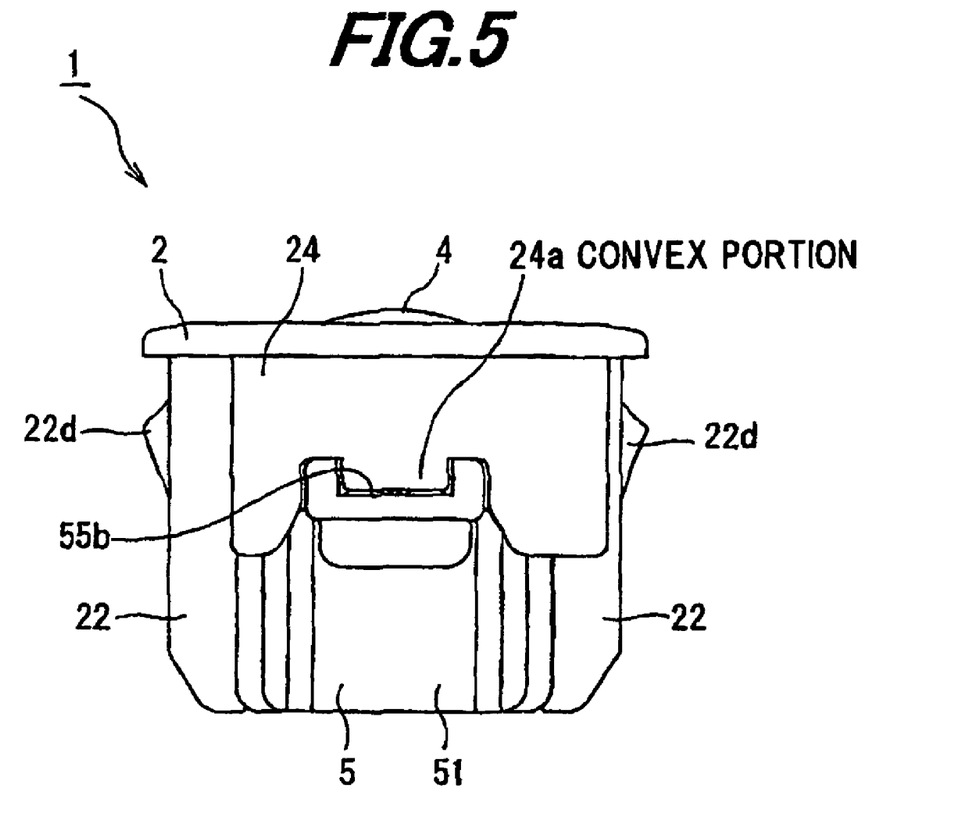
FIG. 5 is a back view showing the light source unit.

FIG. 5 is a back view showing the light source unit.

As shown in FIG. 5, a back wall 24 is formed a plate extending in the vertical direction and its bottom end is higher than the sidewalls 22. The back wall 24 contacts the back end of the top face of the connector portion 5 at the bottom end. The back end of the top face of the connector portion 5 is provided with a concave portion 55b formed centrally in the lateral direction, and in response to this a convex portion 24a is formed at the lower end of the back wall 24. The convex portion 24a as a shielding part can shield externally the concave portion 55b.

As shown in FIG. 4, the connector portion 5 comprises the main body 51 formed a rectangular tube extending in the front-back direction, and connecting terminals 52 to be electrically connected to the harness connector. The connector portion 5 is formed by molding the main body 51 of a resin while the connecting terminals of a metal are inserted.

The main body 51 is formed of, e.g., a resin such as PBT with glass included therein, nylon with glass included therein, LCP (liquid crystal polymer) etc., has an opening 53 at the front side, and can be engaged/disengaged with/from the harness connector by moving the harness connector in the front-back direction. As shown in FIG. 2, on the pair of sidewalls 54 in the lateral direction, the nail portion 54a is formed to engage with the engagement hole 22b of the case 2. Further, the sidewalls 54 are each provided with a ridge portion 54b extending in the vertical direction at the back side, and the ridge portion 54b can be fitted in the groove portion 22f of the case 2. At the four corners of an upper wall 55 of the main body 51, convex portions 55a protrude upward such that they are fitted in notches 61 at the corners of the substrate 6. At the back end of the upper wall 55, a pair of connecting terminals 52 arranged in the lateral direction protrude upward. At the back side of the top face of the upper wall 55, the concave portion 55b is formed to encompass a region with the connecting terminals 52 extending upward.

One end of the connecting terminals 52 are disposed in the cylindrical portion 52 and the other end thereof protrudes upward from the main body 51. In this embodiment, the connecting terminals 52 comprise a connecting part extending forward from the back wall 56 inside the main body 51 and an extension part extending upward from the upper wall 55. Further, the connecting terminals 52 comprise a bend part between the connecting part and the extension part, and the bend part is inserted into the main body 51.

The substrate 6 comprises a glass epoxy substrate such as FR-4 and CEM-3, a paper phenol substrate etc., formed a plate, mounts the LED element 3 at the center, and mounted on the upper wall 55 of the connector portion 5. The notches 61 are formed at the four corners of the substrate 6 such that the substrate 6 can be positioned to the connector portion 5 by the notches 61 and convex portions 55a when the substrate 6 is mounted on the connector portion 5. The substrate 6 further comprises holes 62 through which the connecting terminals 52 are inserted when it is mounted on the connector portion 5.

The lens 4 is formed of a transparent resin such as polycarbonate, acryl etc., and protects the LED element 3 when it is mounted on the substrate 6 for covering the LED element 3. The lens 4 comprises a lens part 41 for optically controlling light emitted from the LED element 3, and a fringe part 42 which is sandwiched between the upper surface of the substrate 6 and the lower surface of the upper wall 21 of the case 2. The lens 41 is circular in top view and disposed inside of the opening 21a of the case 2.

The light source unit 1 is assembled as below.

First, the substrate 6 with the LED element 3 mounted thereon is mounted on the connector portion 5 from above. In this process, the connecting terminals 53 are inserted into the holes 62 and the substrate 6 is positioned to the connector portion 5 by using the notches 61 and the convex portions 55a. Then, the connecting terminals 52 are fixed by a solder material to the holes 62 of the substrate 6. In this embodiment, the solder material is supplied to the upper and lower surfaces of the substrate 6. Here, the upper wall 55 of the connector portion 5 is provided with the concave portion 55b such that a region with the holes 62 formed at the lower face of the substrate 6 is away from the upper wall 55.

Then, while the lens 4 is provisionally attached to the inside of the case 2, the case 2 is attached to the connector portion 5 from above. In this process, the main body 22a of the sidewall 22 of the case 2 contacts the nail portions 54a at the inner face thereof, is expanded by elastic deformation while moving downward, and returns to the original state when the nail portions 54a reach the engagement holes 22b. Also, the ridge portions 54b of the connector portion 5 is fitted in and guided along the groove portion 22e of the sidewalls 22 of the case 2 such that the case 2 can be smoothly moved and positioned to the connector portion 5 in the front-back direction.

Figure 6:
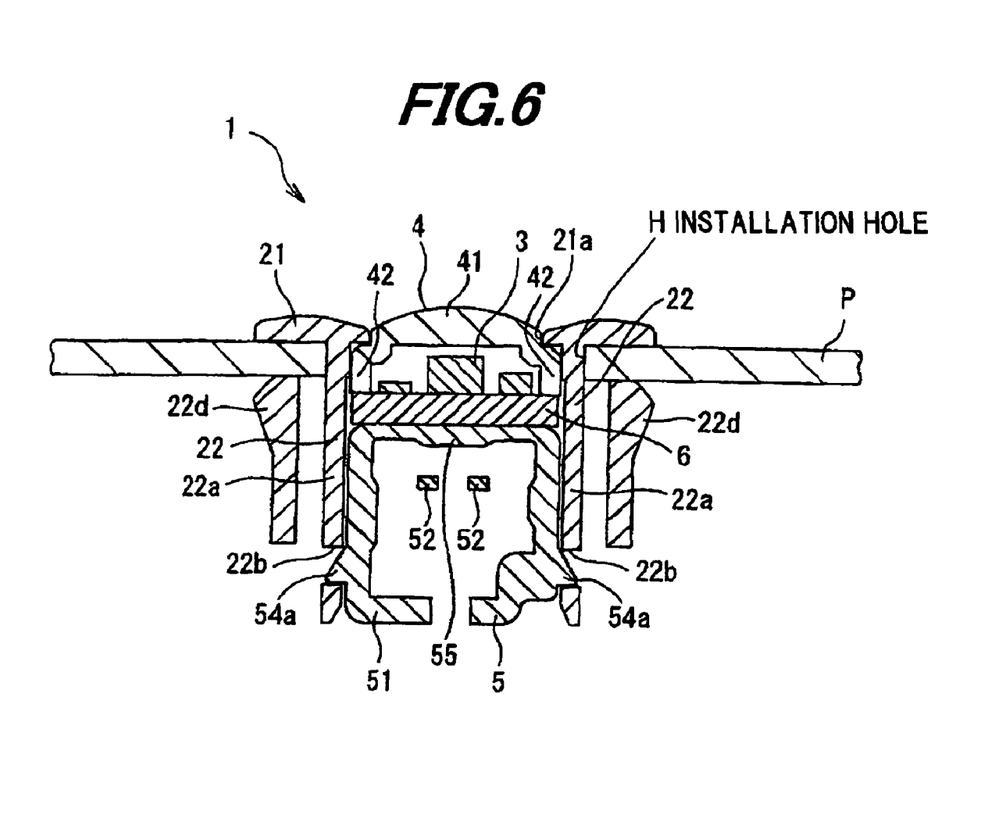
FIG. 6 is a cross sectional view cut along the line A-A in FIG. 3.

FIG. 6 is a cross sectional view cut along the line A-A in FIG. 3.

As shown in FIG. 6, the light source unit 1 thus assembled is fitted in the panel P by inserting the connector portion 5 in the installation hole H formed in the panel P. In this process, the nail portions 22d on the sidewalls 22 of the case 2 are moved inward while being elastically deformed by contacting the inner wall of the installation hole H of the panel P, and returns to the original state when they reach the back face of the panel P.

Effects of the First Embodiment

The light source unit 1 thus constructed can be downsized since the substrate 6 with the LED element 3 mounted thereon is mounted on the main body 51 of the connector portion 5, and the case 2 is engaged with the sidewall 54 of the main body 51 of the connector portion 5. Specifically, in this embodiment, the connector portion 5 is encompassed inside the case 2 (in top view) such that the entire light source unit 1 can be significantly downsized as compared to the conventional light source unit with the connector portion and the case disposed in the lateral direction. Further, since the connector insertion/release direction in the connector portion 5 is parallel to the panel P, it is not necessary to have a large space on the back side of the panel P, and the light source unit 1 is suited to the installation to the vehicle interior.

The light source unit 1 of this embodiment is constructed such that the other end of the connecting terminals 52 of the connector portion 5 protrude from the top of the main body 51, whereby the light source unit 1 can be downsized in the lateral direction as compared to the conventional light source unit with the other end of the connecting terminal extending in the lateral direction. Further, the connecting terminals 52 are previously fixed to the main body 51 of the connector portion 5 such that the design freedom can be enhanced as compared to the conventional unit where the connecting terminals are previously fixed to the substrate.

If the electrical connection material such as solder is used while the substrate 6 is contacted with the connector portion 5, the solder may penetrate into the peripheral places along the contacting surface between the substrate 6 and the connector portion 5 to cause a short circuit. However, in this embodiment, the concave portion 55b is formed at the protrusion site of the connecting terminals 52 in the connector portion 5 such that the connector portion 5 does not contact the substrate 6 at the part for supplying the solder to prevent the short circuit problem.

The concave portion 55b is formed serially from the back end to the protrusion site such that workers can check the soldering process from backward to help them find a failure in electrical connection. The back wall 24 of the case 2 is provided with the convex portion 24a formed along the concave portion 55b such that the electrical connection part can be externally shielded when the case 2 is attached to the connector portion 5. Thereby, this part can be protected and given a good appearance.

The substrate 6 is mounted on the main body 51 of the connector portion 5 such that the LED element 3 can be positioned close to the opening 21a of the case 2. By contrast, in the conventional unit with the substrate disposed next to the connector portion, the shape etc. of the connecting terminals is determined by specifications or standards etc., so that the connector portion interferes with the panel and therefore it is difficult to render the position of the substrate close to the opening. Although the light source unit 1 of this embodiment allows only slightly the design freedom of the connector portion 5, light emitted from the LED element 3 can be efficiently used by rendering the LED element 3 close to the opening 21a.

Further, the engagement hole 22b is formed on the sidewall main body 22a of the case 2 and the nail portion 22d for engagement with the panel P is formed away from the hole 22b such that the engagement functions can be concentrated at the sidewall 22 which can be formed larger than the front wall 23 and the back wall 24 contacting the main body 51 of the connector portion 5. In addition, the sidewall 22 is vertically formed longer than the front wall 23 and the back wall 24 such that the movable range of the elastic deformation necessary for the engagement/disengagement with/from the connector portion 5 and the panel P can be increased to facilitate the engagement/disengagement. The main body 22a of the sidewall 22 is provided with the ribs 22c such that the strength of the main body 22a can be secured. Further, although the sidewall 22 of the case 2 has such a complex shape, the engagement hole 22b does not overlap the nail portion 22d etc. in side view and the nail portion 22d is connected through the ribs 22c protruding from the main body 22a to the main body 22a. Therefore, the case 2 can be readily resin-molded by using a mold.

Figure 7:
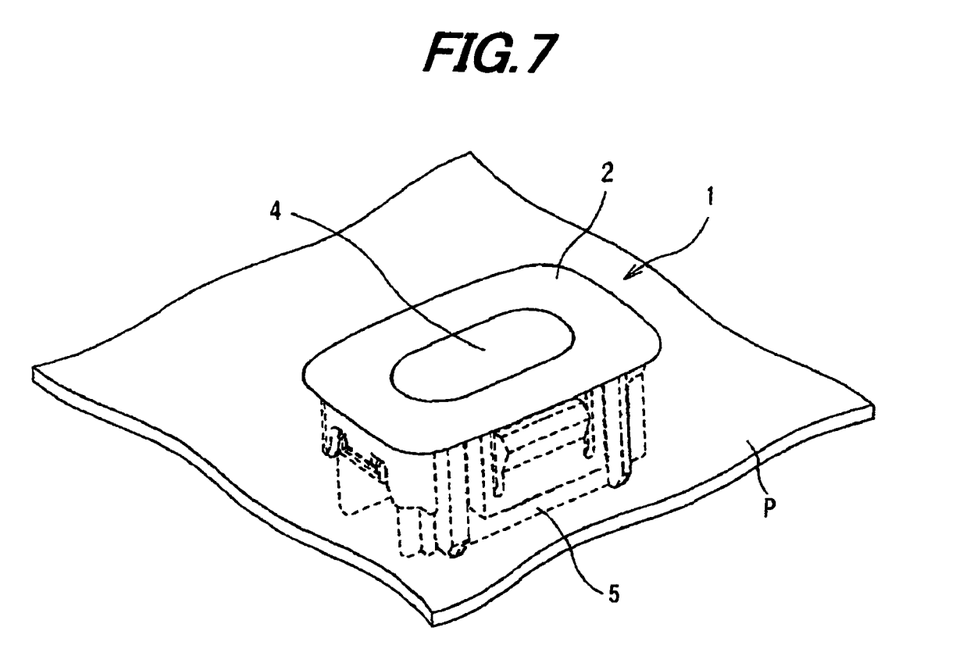
FIG. 7 is perspective view showing a light source unit in a modification of the first embodiment according to the invention, the light source unit being installed in a panel of a vehicle interior.

Although the light source unit 1 of the embodiment is exemplified to be formed square in top view, it may be formed, e.g., rectangular in top view as shown in FIG. 7. In this case, it is preferred that the longitudinal direction of the rectangular form corresponds to the connector engagement/disengagement in the connector portion 5.

Second Embodiment

Figure 8:
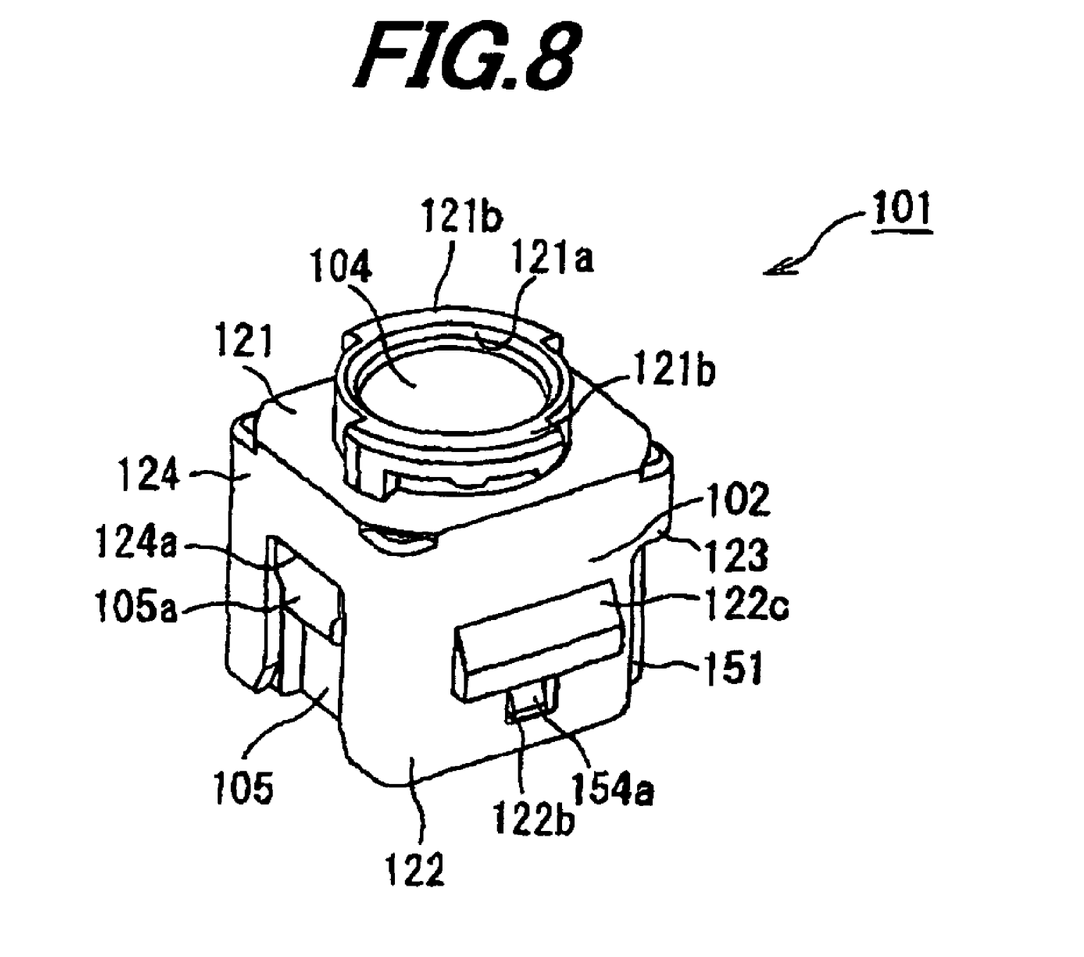
FIG. 8 is a perspective view showing a light source unit in a second preferred embodiment according to the invention.

FIGS. 8 to 11 show the second embodiment of the invention, and FIG. 8 is a perspective view showing a light source unit in the second embodiment.

As shown in FIG. 8, the light source unit 101 comprises a case 102 to be inserted through the installation hole H formed in the panel P, a connector portion 105 engaged, with the case 102, a substrate 106 mounted on the connector portion 105, an LED element 103 mounted on the substrate 106, and a lens 104 covering the LED element 103 and disposed over the substrate 106.

Figure 9:
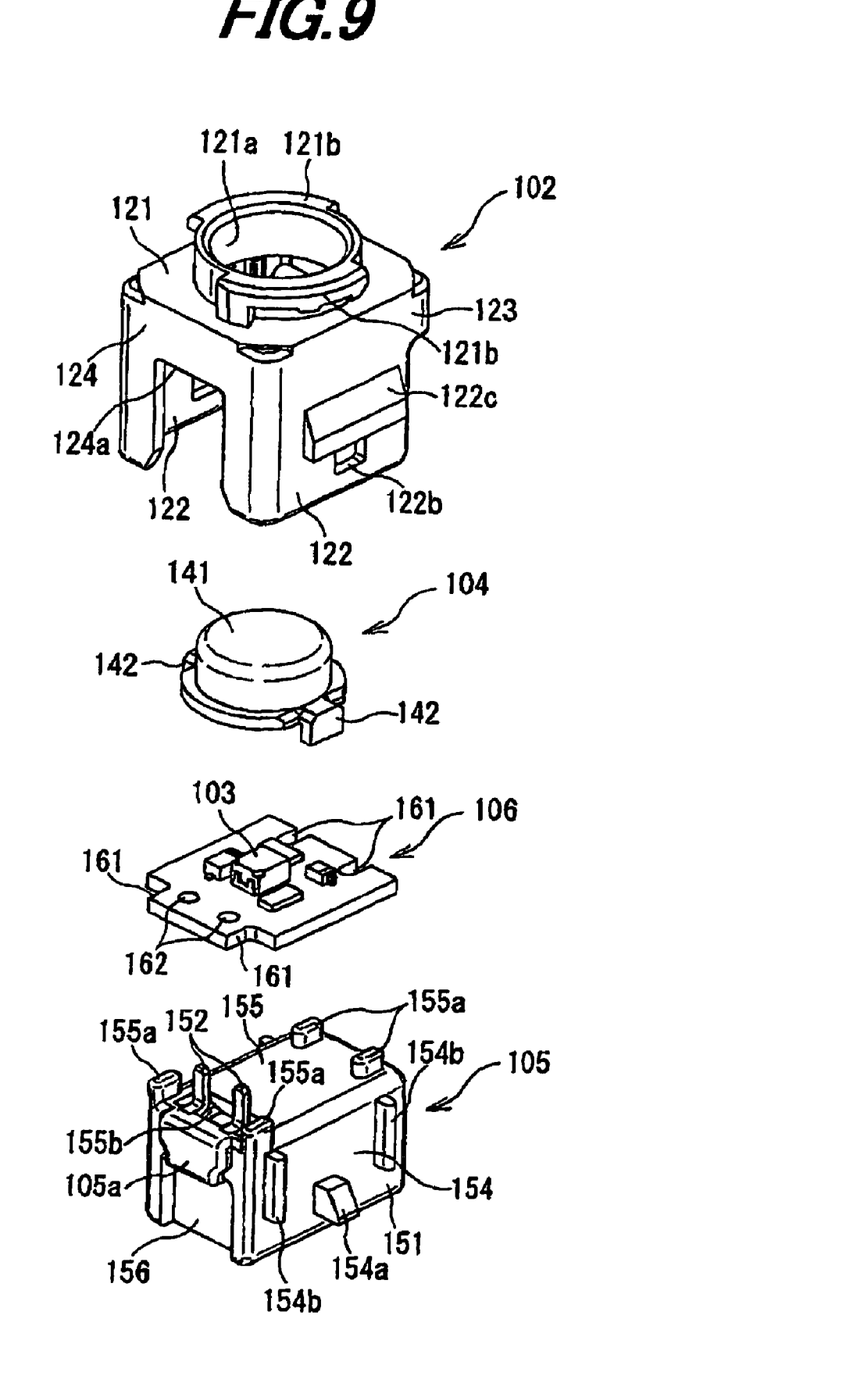
FIG. 9 is a perspective broken view showing the light source unit of the second embodiment.

FIG. 9 is a perspective broken view showing the light source unit 101. The case 102 is formed of, e.g., a resin such as PBT, PP, ABS, PA etc. and comprises a upper wall 121 exposed to the vehicle interior from the panel P, a pair of sidewalls 122 disposed laterally and extending downward from the bottom face of the upper wall 121, and a front wall 123 and a back wall 124 extending downward from the outer edge of the upper wall 121. The upper wall 121 has a cylindrical opening 121a for disposing at the center thereof the lens 104. In this embodiment, the opening 121a protrudes upward from the upper wall 121 and is provided with an engagement portion 121b formed outward at the top end thereof for engaging with the panel P.

Figure 10:
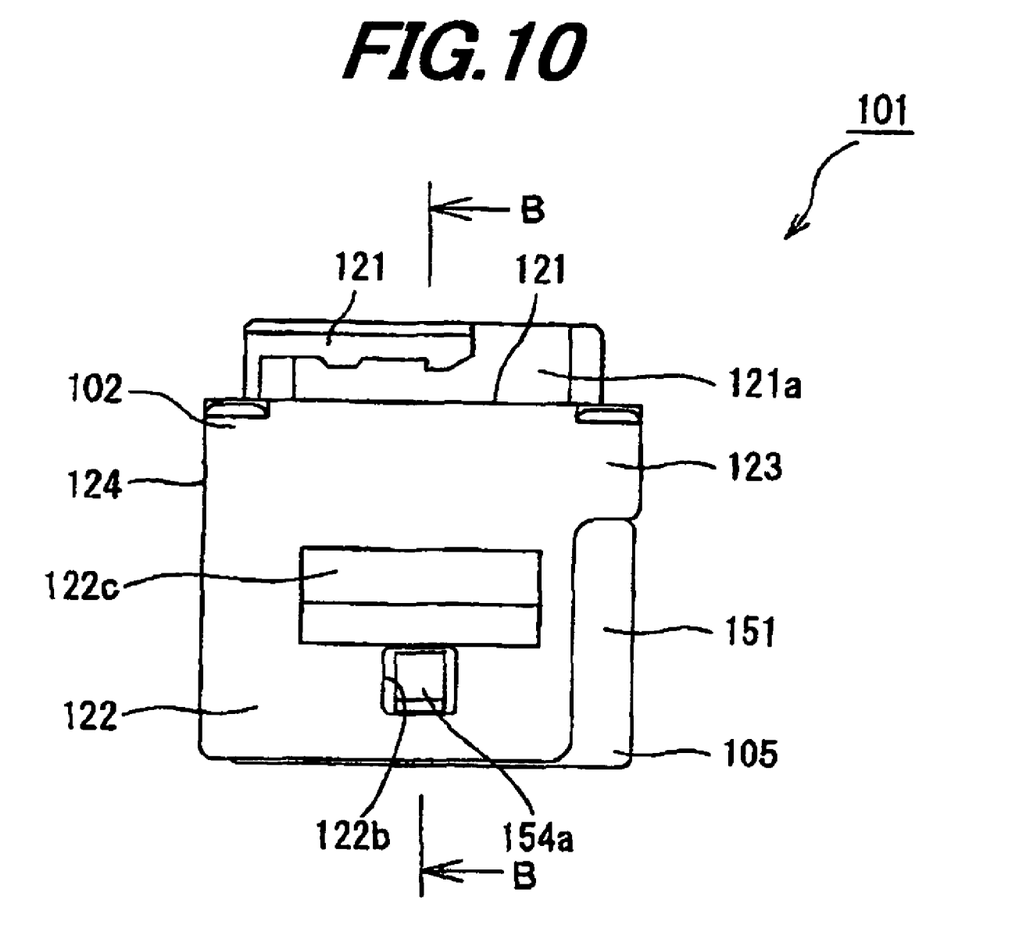
FIG. 10 is a side view showing the light source unit of the second embodiment.

FIG. 10 is a side view showing the light source unit 101.

As shown in FIG. 10, the sidewalls 122 are each formed a plate extending in the vertical direction and has a rectangular engagement hole 122b to engage with a nail portion 154a of the connector portion 105 at a lower and central part thereof. The sidewalls each comprise a rib 122 extending in the front-back direction.

The front wall 123 is formed a plate extending vertically such that its bottom end is higher than the sidewalls 122. The front wall 123 contacts the front end of the top face of the connector portion 105 at the bottom end.

As shown in FIG. 8, the back wall 124 is formed a plate extending in the vertical direction as in the front wall 123 and provided at the center with a groove-shaped concave portion 124a notched from the bottom end. The back wall 124 contacts a convex portion 105a formed at the back end of the connector portion 5 at the concave portion 124a.

A main body 151 of the connector portion 105 is formed of, e.g., a resin such as PBT with glass included therein, nylon with glass included therein, LCP (liquid crystal polymer) etc., has an opening at the front side, and can be engaged/disengaged with/from the harness connector by moving the harness connector in the front-back direction. As shown in FIG. 9, on the pair of sidewalls 154 in the lateral direction, the nail portion 154a is formed to engage with the engagement hole 122b of the case 102. Further, the sidewalls 154 are each provided with ridge portions 154b extending in the vertical direction at the front and back sides, and the ridge portion 154b can be contacted with the inner face of the sidewall 122 of the case 102. On an upper wall 155 of the main body 151, convex portions 155a protrude upward such that they are fitted in notches 161 of the substrate 106. In this embodiment, the convex portions 155a are formed at the corner of the back end and near at the corner of the front end. At the back end of the upper wall 155, a pair of connecting terminals 152 arranged in the lateral direction protrude upward. At the back side of the top face of the upper wall 155, a concave portion 155b is formed where the connecting terminals 152 penetrate the upper wall 155.

The connecting terminals 152 comprise a connecting part extending forward from the back wall 156 inside the main body 151 and an extension part extending upward from the upper wall 155. Further, the connecting terminals 152 comprise a bend part between the connecting part and the extension part.

The substrate 106 comprises a glass epoxy substrate such as FR-4 and CEM-3, a paper phenol substrate etc., formed a plate, mounts the LED element 103 at the center, and mounted on the upper wall 155 of the connector portion 105. The substrate 106 can be positioned to the connector portion 105 by the notches 161 and convex portions 155a when the substrate 106 is mounted on the connector portion 105. The substrate 106 further comprises holes 162 through which the connecting terminals 152 are inserted when it is mounted on the connector portion 105.

The lens 104 is formed of a transparent resin such as polycarbonate, acryl etc., and protects the LED element 103 when it is mounted on the substrate 106 for covering the LED element 103. The lens 104 comprises a lens part 141 for optically controlling light emitted from the LED element 103, and a fringe part 142 which is sandwiched between the upper surface of the substrate 106 and the lower surface of the upper wall 121 of the case 102. The lens 141 is circular in top view and disposed inside of the opening 121a of the case 102.

The light source unit 101 is assembled as below.

First, the substrate 106 with the LED element 103 mounted thereon is mounted on the connector portion 105 from above. Then, the connecting terminals 152 are fixed by a solder material to the holes 162 of the substrate 106. Here, the upper wall 155 of the connector portion 105 is provided with the concave portion 155b such that a region with the holes 162 formed at the lower face of the substrate 106 is away from the upper wall 155.

Then, while the lens 104 is provisionally attached to the inside of the case 102, the case 102 is attached to the connector portion 105 from above. In this process, the sidewalls 122 of the case 2 contact the nail portions 154a at the inner face thereof, is expanded by elastic deformation while moving downward, and returns to the original state when the nail portions 154a reach the engagement holes 122b.

Figure 11:
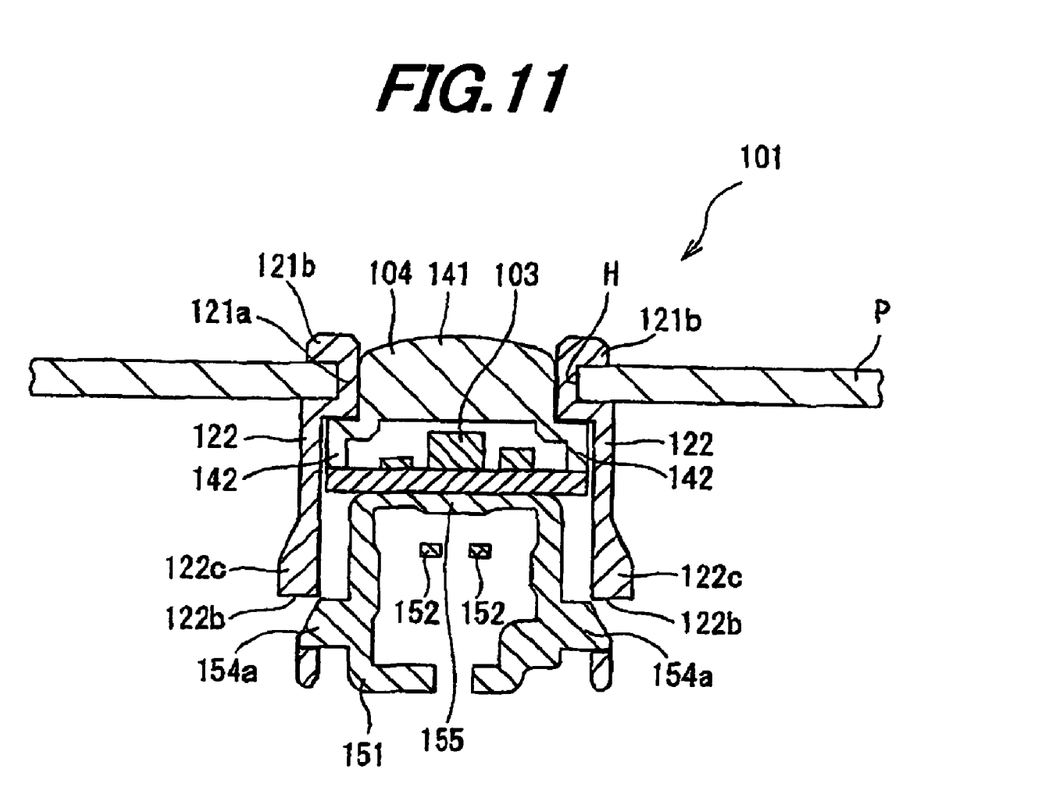
FIG. 11 is a cross sectional view cut along the line B-B in FIG. 10.

FIG. 11 is a cross sectional view cut along the line B-B in FIG. 10.

As shown in FIG. 11, the light source unit 101 thus assembled is fitted in the panel P through the installation hole H formed in the panel P from the back side of the panel P. In this embodiment, since the installation hole H has the same form (in top view) as the opening 121a and the engagement portion 121b, the engagement portion 121b is placed at the front side of the panel P by inserting the top end side of the opening 121a and the engagement portion 121b into the installation hole H and the case 102 is then turned such that the engagement portion 121b is engaged with the panel P.

Effects of the Second Embodiment

The light source unit 101 thus constructed can be downsized since the substrate 106 with the LED element 103 mounted thereon is mounted on the main body 151 of the connector portion 105, and the case 102 is engaged with the sidewall 154 of the main body 151 of the connector portion 105. Also in this embodiment, the connector portion 105 is encompassed inside the case 102 (in top view) such that the entire light source unit 101 can be significantly downsized as compared to the conventional light source unit with the connector portion and the case disposed in the lateral direction. Further, since the connector insertion/release direction in the connector portion 105 is parallel to the panel P, it is not necessary to have a large space on the back side of the panel P, and the light source unit 101 is suited to the installation to the vehicle interior.

The light source unit 101 of this embodiment is constructed such that the other end of the connecting terminals 152 of the connector portion 105 protrude from the top of the main body 151, whereby the light source unit 101 can be downsized in the lateral direction as compared to the conventional light source unit with the other end of the connecting terminal extending in the lateral direction. Further, the connecting terminals 512 are previously fixed to the main body 151 of the connector portion 105 such that the design freedom can be enhanced as compared to the conventional unit where the connecting terminals are previously fixed to the substrate.

If the electrical connection material such as solder is used while the substrate 106 is contacted with the connector portion 105, the solder may penetrate into the peripheral places along the contacting surface between the substrate 106 and the connector portion 105 to cause a short circuit. However, in this embodiment, the concave portion 155b is formed at the protrusion site of the connecting terminals 152 in the connector portion 105 such that the connector portion 105 does not contact the substrate 106 at the part for supplying the solder to prevent the short circuit problem.

The substrate 106 is mounted on the main body 151 of the connector portion 105 such that the LED element 103 can be positioned close to the opening 121a of the case 102. Although the light source unit 101 of this embodiment allows only slightly the design freedom of the connector portion 105, light emitted from the LED element 103 can be efficiently used by rendering the LED element 103 close to the opening 121a.

Modification

Although in the first and second embodiments the ribs 22c and 122c are formed on the sidewall 22 and 122, respectively, they are not always to be formed.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle interior light source unit for being disposed at an installation hole formed in a panel of a vehicle interior, the vehicle interior light source unit comprising:
    a connector portion that is disposed on a back side of the panel and comprises a protruding portion and a tubular main body extending parallel to the panel;
    a substrate that is mounted on the connector portion through a receiving portion of the substrate that engages with the protruding portion of the connector portion, a light emitting element being mounted on the substrate; and
    a case to be inserted into the installation hole,
    wherein the case comprises an upper wall comprising an opening for radiating light emitted from the light emitting element to the vehicle interior, and a pair of sidewalls comprising a connector engagement portion to be engaged with a side portion of the main body of the connector portion.

2. The vehicle interior light source according to claim 1, wherein the protruding portion of the connector portion comprises a connecting terminal comprising one end disposed in the main body and an other end extending upward, and
    wherein the receiving portion of the substrate comprises a hole into which the connecting terminal is inserted.

3. The vehicle interior light source according to claim 2, wherein the main body comprises a concave portion comprising a region in which the connecting terminal extends upward, and
    wherein the connecting terminal is fixed to the substrate by a solder material.

4. The vehicle interior light source according to claim 3, wherein the case further comprises a shielding portion for shielding externally the concave portion.

5. The vehicle interior light source according to claim 3, wherein the sidewalls of the case each comprises a sidewall main body on which the connector engagement portion is formed, and a panel engagement portion that is disposed away from the sidewall main body and is adapted to be engaged with the panel.

6. The vehicle interior light source according to claim 5, wherein the sidewalls of the case each further comprises a pair of ribs protruding from the sidewall main body and extending in a vertical direction, and
    wherein the panel engagement portion is disposed between the ribs and is connected to a lower part of the ribs.

7. The vehicle interior light source according to claim 1, wherein the case encompasses the connector portion.

8. The vehicle interior light source according to claim 1, wherein the protrusion portion comprises one end disposed in the main body and an other end extending upward from a surface of the connector portion.

9. The vehicle interior light source according to claim 1, wherein the main body comprises a concave portion comprising a region in which the protruding portion extends upward.

10. The vehicle interior light source according to claim 9, wherein the case further comprises a shielding portion that externally shields the concave portion.

11. The vehicle interior light source according to claim 1, wherein a solder material inserted in the receiving portion mounts the substrate to the connector portion.

12. The vehicle interior light source according to claim 1, wherein each of the sidewalls of the case comprises:
    a sidewall main body on which the connector engagement portion is formed; and
    a panel engagement portion that is disposed away from the sidewall main body for engagement with the panel.

13. The vehicle interior light source according to claim 1, wherein each of the sidewalls of the case comprises:
    a sidewall main body on which the connector engagement portion is formed; and
    a pair of ribs protruding from the sidewall main body and extending in a vertical direction.

14. The vehicle interior light source according to claim 13, wherein said each of the sidewalls of the case further comprises:
    a panel engagement portion that is disposed away from the sidewall main body for engagement with the panel,
    wherein the panel engagement portion is disposed between the ribs and is connected to a lower part of the ribs.

15. A vehicle interior light source unit for insertion into an opening of a panel of a vehicle interior, the vehicle interior light source unit comprising:
    a connector portion that is disposed on a back side of the panel, the connector portion comprising a connecting terminal that protrudes from a surface of the connector portion;
    a substrate that is mounted on the connector portion and comprises a hole into which the connecting terminal is inserted, a light emitting element being mounted on the substrate; and
    a case for insertion into the opening of the panel,
    wherein the case comprises an upper wall comprising an opening for radiating light emitted from the light emitting element to the vehicle interior, and a pair of sidewalls comprising a connector engagement portion for engaging with a side portion of the connector portion.

16. The vehicle interior light source according to claim 15, wherein the connecting terminal comprises one end disposed on the surface of the connector portion and an other end extending upward from the surface of the connector portion.

17. The vehicle interior light source according to claim 16, wherein the connector portion comprises a tubular main body that extends parallel to the panel.

18. The vehicle interior light source according to claim 15, wherein the connector portion comprises a tubular main body that extends parallel to the panel.

19. The vehicle interior light source according to claim 18, wherein the main body comprises a concave portion comprising a region in which the connecting terminal extends upward.

20. The vehicle interior light source according to claim 15, wherein a solder material inserted in said hole mounts the substrate to the connector portion.

* * * * *